US 8,816,902 B2

(12) United States Patent
Itoh

(10) Patent No.: US 8,816,902 B2
(45) Date of Patent: Aug. 26, 2014

(54) RADAR APPARATUS

(75) Inventor: Hiroshi Itoh, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 286 days.

(21) Appl. No.: 13/473,013

(22) Filed: May 16, 2012

(65) Prior Publication Data

US 2012/0293358 A1 Nov. 22, 2012

(30) Foreign Application Priority Data

May 17, 2011 (JP) ................. 2011-110401

(51) Int. Cl.
*G01S 13/46* (2006.01)
*G01S 13/06* (2006.01)
*G01S 7/35* (2006.01)
*G01S 13/00* (2006.01)
*G01S 7/00* (2006.01)

(52) U.S. Cl.
USPC ............. 342/192; 342/27; 342/70; 342/89; 342/104; 342/107; 342/109; 342/113; 342/115; 342/118; 342/128; 342/146; 342/147; 342/156; 342/195; 342/196

(58) Field of Classification Search
USPC ............. 342/27, 28, 70–72, 89–93, 104–116, 342/118, 128–147, 156–162, 175, 190–197
See application file for complete search history.

(56) References Cited

U.S. PATENT DOCUMENTS

| | | | | |
|---|---|---|---|---|
| 3,568,189 A | * | 3/1971 | Poirier ........................... | 342/156 |
| 4,630,051 A | * | 12/1986 | Adams et al. ................. | 342/133 |
| 6,140,954 A | * | 10/2000 | Sugawara et al. ............. | 342/70 |
| 6,292,129 B1 | * | 9/2001 | Matsugatani et al. .......... | 342/70 |
| 6,320,531 B1 | * | 11/2001 | Tamatsu ........................ | 342/109 |
| 6,452,532 B1 | * | 9/2002 | Grisham ........................ | 342/191 |
| 6,674,393 B2 | * | 1/2004 | Kishida ........................... | 342/70 |
| 6,753,805 B2 | * | 6/2004 | Nakanishi et al. ............. | 342/128 |
| 6,795,012 B2 | * | 9/2004 | Nakanishi et al. ............... | 342/70 |
| 7,034,743 B2 | * | 4/2006 | Nakanishi et al. ............. | 342/128 |
| 7,391,361 B2 | * | 6/2008 | Kishida ......................... | 342/109 |
| 7,394,422 B2 | * | 7/2008 | Nohmi .......................... | 342/107 |
| 7,436,348 B2 | * | 10/2008 | Nohmi .......................... | 342/159 |
| 7,579,981 B2 | * | 8/2009 | Kishida ......................... | 342/109 |
| 7,884,756 B2 | * | 2/2011 | Kai ............................... | 342/192 |

FOREIGN PATENT DOCUMENTS

JP    A-2004-69340    3/2004

* cited by examiner

*Primary Examiner* — Bernarr Gregory
(74) *Attorney, Agent, or Firm* — Oliff PLC

(57) ABSTRACT

There is provided a radar apparatus for detecting a target. A detection signal generating unit generates detection signals of the target based on transmission and reception waves of antennas. A detection signal processing unit performs frequency analysis on the detection signals to extract signal components of the target, and performs a predetermined process on the signal components to calculate at least one of a distance to the target, a relative speed to the target, and an orientation of the target. The detection signal generating unit includes a filter unit for giving changes to the detection signals in a frequency bandwidth higher than Nyquist frequency which is a half a sampling frequency. The detection signal processing unit acquires the signal components from the detection signals to which the filter unit gives the changes to determine whether the signal components are generated by replication due to the Nyquist frequency.

7 Claims, 13 Drawing Sheets

*FIG. 12*

PEAK INFORMATION OF ANGLE
SPECTRUM (UPBEAT FREQUENCY COMPONENT)

| PEAK | FREQUENCY | ANGLE | POWER |
|------|-----------|-------|-------|
| U1   | FU1       | $\theta U1$ | PWU1 |
| U2   |           | $\theta U2$ | PWU2 |
| U3   | FU2       | $\theta U3$ | PWU3 |
| U4   |           | $\theta U4$ | PWU4 |
| U5   |           | $\theta U5$ | PWU5 |
| U6   | FU3       | $\theta U6$ | PWU6 |

— TG1
— TG2
— TG3
— TG4
— TG5

PEAK INFORMATION OF ANGLE
SPECTRUM (DOWNBEAT FREQUENCY COMPONENT)

| PEAK | FREQUENCY | ANGLE | POWER |
|------|-----------|-------|-------|
| D1   | FD1       | $\theta D1$ | PWD1 |
| D2   |           | $\theta D2$ | PWD2 |
| D3   | FD2       | $\theta D3$ | PWD3 |
| D4   |           | $\theta D4$ | PWD4 |
| D5   |           | $\theta D5$ | PWD5 |

*FIG. 13*

DATA OF EACH TARGET

| TARGET | ANGLE | DISTANCE | SPEED |
|---|---|---|---|
| TG1 | D1 | R1 | V1 |
| TG2 | D2 | R2 | V2 |
| TG3 | D3 | R3 | V3 |
| TG4 | D4 | R4 | V4 |
| TG5 | D5 | R5 | V5 |

RADAR APPARATUS

The disclosure of Japanese Patent Application No. 2011-110401 filed on May 17, 2011, including specification, drawings and claims is incorporated herein by reference in its entirety.

BACKGROUND

The present invention relates to a radar apparatus.

In a radar apparatus, a target in a frequency bandwidth higher than Nyquist frequency which is a half the sampling frequency for AD conversion of a beat signal, may appear as a ghost by replicating to a frequency bandwidth lower than Nyquist frequency. Such a replication of a frequency is generated on a frequency spectrum, as a result of performing FFT analysis on the beat signal generated by mixing a reception wave and transmission wave, that is, a detection signal. FIG. 1 is a diagram illustrating a state where a frequency replicates in a frequency spectrum obtained by FFT analysis. In FIG. 1, the vertical axis indicates the strength of a reception signal and the horizontal axis indicates a frequency. In FIG. 1, two signal components TG1, TG2 are shown as the signal components of the target, in which TG1 indicated by a solid line is a correct signal component of the target and TG2 indicated by a dashed line shows a signal component generated by the replication due to Nyquist frequency.

When the replication of frequency is generated, which is shown in FIG. 1, it is difficult to accurately detect the distance to the target or the speed of the target. That is, TG2 which is actually a distant target is erroneously detected as a closer target.

In order to solve this problem, in the related art, for example, a baseband circuit has been provided with a band-pass filter having a precipitous cutoff characteristic. FIG. 2 is a diagram illustrating a state where the precipitous band-pass filter is set, in which the frequency characteristic of the band-pass filter is overlapped on the frequency spectrum obtained by the FFT analysis. In FIG. 2, the vertical axis indicates the magnitude of a reception signal and the horizontal axis indicates a frequency. In FIG. 2, two signal components TG1, TG2 are shown as the signal components of the target, in which TG1 indicated by a solid line is a correct signal component of the target and TG2 indicated by a dashed line shows a signal component generated due to the replication by Nyquist frequency. In FIG. 2, as the precipitous band-pass filter is set, the signal components of the target higher than Nyquist frequency are attenuated and the signal components generated by the replication are also attenuated. As a result, the signal components generated by the replication become less than a threshold, and thus an error in detection of TG2 is avoided. Patent Document 1 discloses a technology relating to the above. Patent Document 1 discloses a radar apparatus that determines incidence of the replication of the frequency.

Patent Document 1: JP-A-2004-069340

In the related art, as the cutoff characteristic of the band-pass filter is made precipitous, the number of parts of the circuit, such as a resistor, a capacitor, and an operational amplifier, in the band-pass filter may increase. As the number of parts increases, it is difficult to achieve a small-sized band-pass filter and the cost may increase. An available baseband bandwidth may be limited by the cutoff characteristic of the band-pass filter. To avoid these problems, for example, a superspeed AD converter may be used. The superspeed AD converter performs oversampling to form a digital filter by a signal processing, and thus the replication by Nyquist frequency can be removed. However, the cost of a radar apparatus may be considerably increased with the use of the superspeed AD converter.

SUMMARY

It is therefore an object of the present invention to provide a technology of detecting signal components generated by replication due to Nyquist frequency without increasing the number of parts.

In order to achieve the above object, according to one aspect of the embodiments of the present invention, there is provided a radar apparatus including a plurality of receiving antennas, which gives changes to detection signals corresponding to the antennas at a frequency bandwidth higher than Nyquist frequency and acquires signal components of the target from the detection signals corresponding to the antennas to which the changes are given to determine whether the signal components of the target are generated by replication due to Nyquist frequency.

More particularly, there is provided a radar apparatus configured to detect the target, the radar apparatus comprising: a plurality of antennas; a detection signal generating unit configured to generate detection signals of the target on the basis of transmission and reception waves of the antennas; and a detection signal processing unit configured to perform frequency analysis on the detection signals of the target, which are generated by the detection signal generating unit to extract signal components of the target, and to perform a predetermined process on the signal components to calculate at least one of a distance to the target, a relative speed to the target, and an orientation of the target, wherein the detection signal generating unit includes a filter unit configured to give changes to the detection signals corresponding to the antennas, respectively, in a frequency bandwidth higher than Nyquist frequency which is a half a sampling frequency, and wherein the detection signal processing unit is configured to acquire the signal components from the detection signals corresponding to the antennas, respectively, to which the filter unit gives the changes to determine whether the signal components are generated by replication due to the Nyquist frequency.

In the radar apparatus, changes are given to the detection signals corresponding to the antennas at a frequency bandwidth higher than Nyquist frequency that is a half the sampling frequency, and the frequency analysis is performed on the detection signals given the changes. As a result, when the signal components of the target is not generated by the replication due to Nyquist frequency, the signal components are not changed, but when the signal components of the target are generated by the replication due to Nyquist frequency, signal components given changes by the filter unit are acquired. Therefore, it is possible to determine whether the signal components of the target are generated by the replication due to Nyquist frequency. It is possible to prevent a detection error of the target due to acquiring of the signal components generated by the replication, when it is possible to determine whether the signal components of the target are generated by the replication due to Nyquist frequency. In the radar apparatus, since it is not necessary to make the cutoff characteristic of the band-pass filter precipitous, contrary to the related art, the number of parts can be suppressed and thus the cost can be suppressed. The radar apparatus, for example, does not need oversampling of a superspeed AD converter, such that the cost of the radar apparatus does not largely increase.

In the radar apparatus, the filter unit may give changes to at least one of a strength of each of the detection signals and a phase of each of the detection signals. In the radar apparatus, the filter unit may include a plurality of filters corresponding to the antennas, respectively, and one of the filters has a different characteristic from another of the filters. By giving changes to the detection signal, it is possible to determine whether the signal components of the target are generated by the replication due to Nyquist frequency, on the basis of the changes.

The detection signal processing unit may determine that the signal components are generated by the replication due to the Nyquist frequency when the signal components having different levels are detected at one frequency value. The detection signal processing unit may determine that the signal components are generated by the replication due to the Nyquist frequency when a level difference between the signal components at the same frequency is a predetermined value or more. The detection signal processing unit may determine that the signal components are generated by the replication due to the Nyquist frequency when a phase difference between the signal components at one frequency is a predetermined value or more.

The present invention can be specified as a method of detecting a target with the radar apparatus described above. According to another aspect of the embodiments of the present invention, there is provided a method of detecting a target with a radar apparatus equipped with a plurality of antennas, the method comprising: a detection signal generating step of generating detection signals of the target on the basis of transmission and reception waves of the antennas; and a detection signal processing step of performing frequency analysis on the detection signals of the target, which are generated in the detection signal generating step to extract signal components of the target, and performing a predetermined process on the signal components to calculate at least one of a distance to the target, a relative speed to the target, and an orientation of the target, wherein the detection signal generating step includes a filtering step of giving changes to the detection signals corresponding to the antennas, respectively, in a frequency bandwidth higher than Nyquist frequency which is a half a sampling frequency, and wherein the detection signal processing step acquires the signal components from the detection signals corresponding to the antennas, respectively, to which the filtering step gives the changes to determine whether the signal components are generated by replication due to the Nyquist frequency.

Moreover, the present invention can also be specified as a detection signal generating unit constituting the radar apparatus described above. The present invention may be a processing method performed by the radar apparatus described above, the detection signal generating unit and the filter unit or a program that implements the processing method. The present invention may be a computer-readable recording medium recording the program. In this case, it is possible to provide the functions by allowing a computer to read and execute the program on the recording medium. The computer-readable recording medium means a recording medium on which the information such as data or programs is accumulated by an electric, magnetic, optical, mechanical, or chemical operation, and which can be read by a computer.

According to the invention, it is possible to provide a technology of detecting signal components generated by the replication due to Nyquist frequency without increasing the number of parts.

BRIEF DESCRIPTION OF THE DRAWINGS

In the accompanying drawings:
FIG. 12 is a diagram illustrating an example of the angle and the power of each peak in angle spectrums for five peak frequency FU1-3, FD1-2;
and
FIG. 13 is a diagram illustrating an example of data of respective targets.

DETAILED DESCRIPTION OF THE EMBODIMENTS

Figure 1:
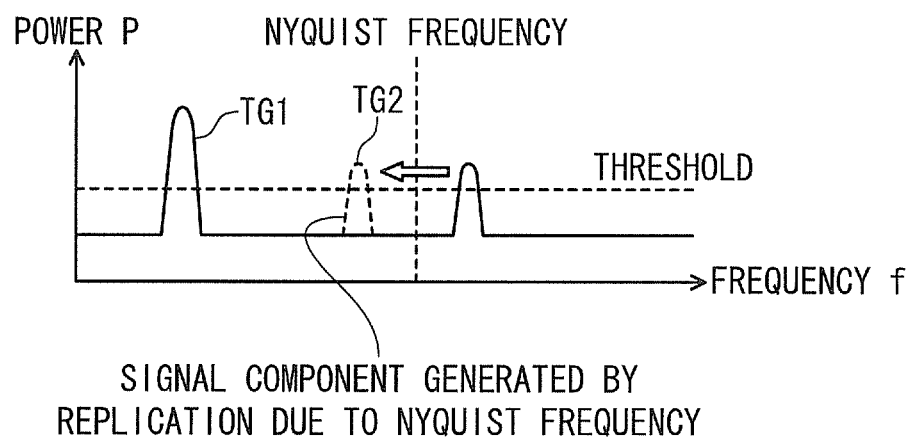
FIG. 1 is a diagram illustrating a state where the frequency replicates in the frequency spectrum obtained by the FFT analysis.
Figure 2:
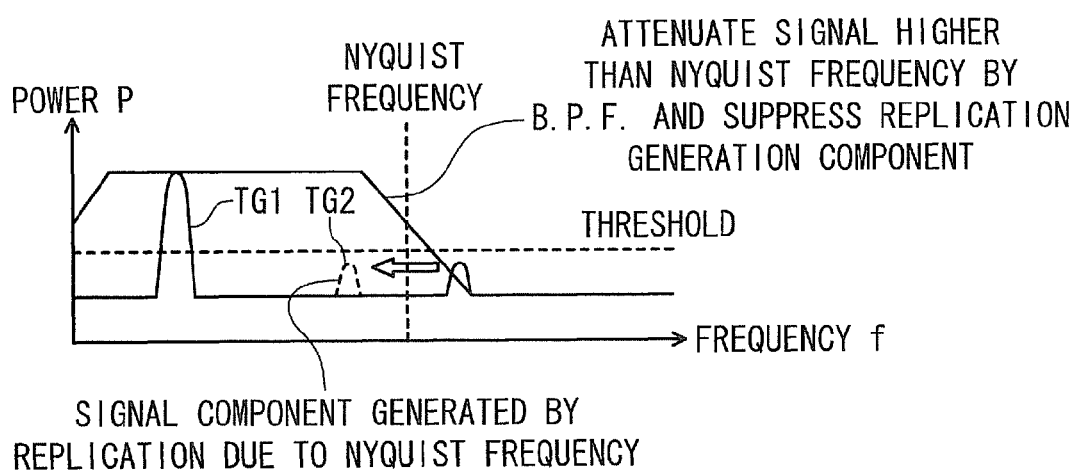
FIG. 2 is a diagram illustrating a state where a precipitous band-pass filter is set.
Figure 3:
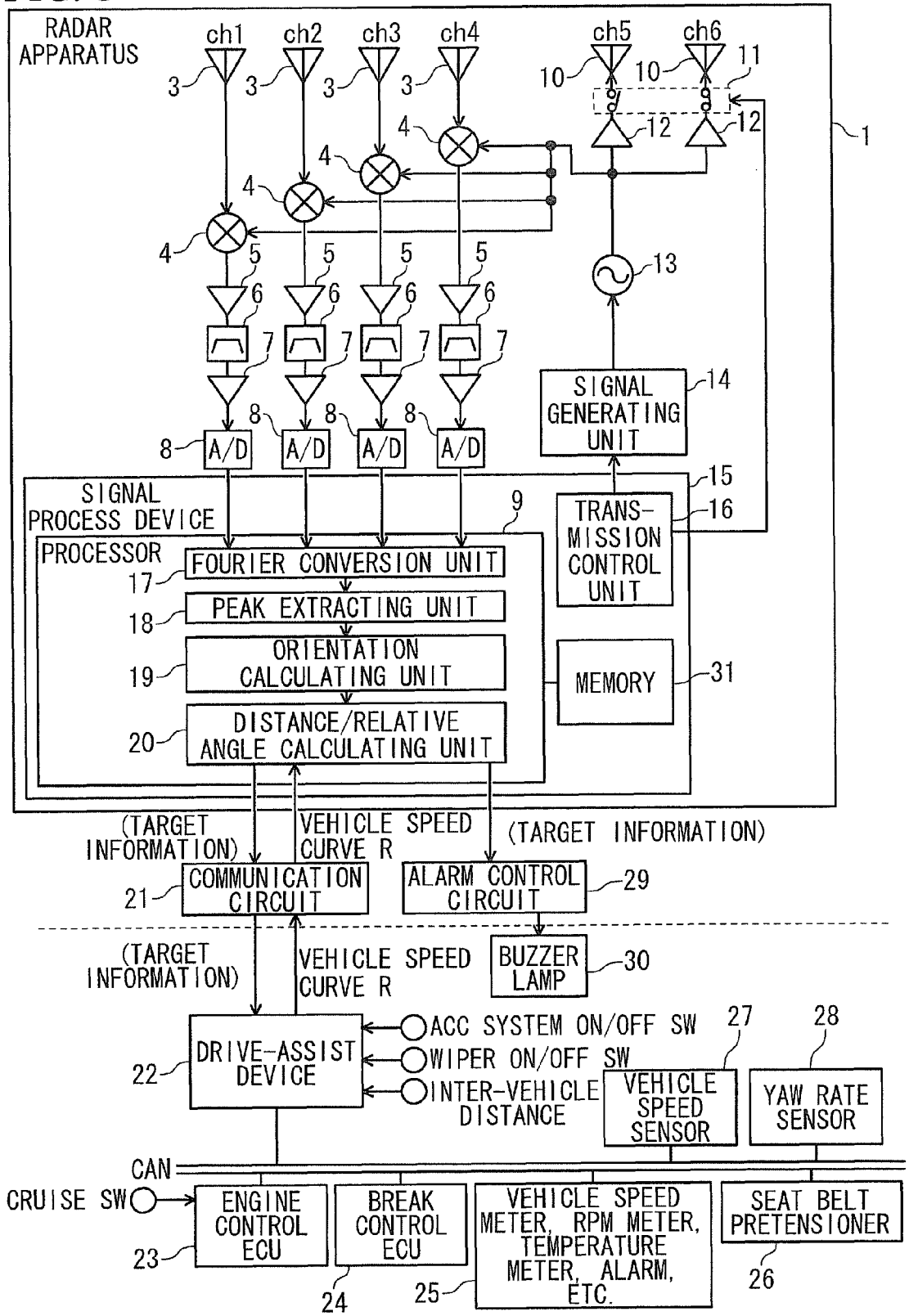
FIG. 3 is a diagram illustrating the configuration of a radar apparatus according to an embodiment.

Embodiments of a radar apparatus of the invention are described with reference to the drawings. The following embodiments are examples and the scope of the invention is not limited thereto.
<Configuration>
FIG. 3 is a diagram illustrating the configuration of a radar apparatus 1 according to an embodiment. The radar apparatus 1 is mounted in a vehicle and configured to detect a target, such as another vehicle or an obstacle, by monitoring the areas around the vehicle. The detection result of the target is outputted to a drive-assist device 22 through a communication circuit 21 and used for control of the vehicle. The detection result of the target is also outputted to a buzzer lamp 30 through an alarm control circuit 29. The radar apparatus according to the embodiment may be used for various purposes (for example, monitoring an airplane in flight or a ship under sail), other than being mounted in a vehicle.

The radar apparatus 1 includes a signal processing device 15 equipped with receiving antennas 3 (ch1-4) arranged at regular intervals, mixers 4 (ch1-4) respectively connected to the receiving antennas 3, low-noise amplifiers 5 (ch1-4) respectively connected to the mixers 4, bandwidth filters 6 (ch1-4) respectively connected to the low-noise amplifiers 5, amplifiers 7 (ch1-4) respectively connected to the bandwidth filters 6, AD (Analog to Digital) converters 8 (ch1-4) respectively connected to the amplifiers 7, and a processor 9 that processes data from the AD converters 8. The radar apparatus 1 also includes transmitting antennas 10 (ch5-6), transmission conversion switches 11 respectively connected to the transmitting antennas 10, power amplifiers 12 respectively connected to the transmission conversion switches 11, an oscillator 13 connected to the power amplifiers 12, a signal generating unit 14 connected to the oscillator 13, and a transmission control unit 16 connected to the signal generating unit 14.

In this configuration, the mixers 4, low-noise amplifiers 5, bandwidth filters 6, amplifiers 7, and AD converters 8 constitute a baseband circuit, which corresponds to a detection signal generating unit of the present invention. In the baseband circuit, in addition to common processing, such as mixing of a reception wave and a transmission wave, removal of signals in an unnecessary bandwidth, amplification of beat signals, and AD conversion, changes are given to detection signals corresponding to the receiving antennas 3 in a frequency bandwidth higher than Nyquist frequency that is a half the sampling frequency for AD conversion in the embodiment. The detail is described below.

In the radar apparatus 1, although exclusive receiving circuits may be provided for the receiving antennas, respectively, as described above, a receiving circuit that integrally receives detection signals from all the receiving antennas may be provided. In this case, it becomes necessary to perform control of sequentially switching receiving antennas corresponding to the reception signals in time division, but it is possible to make the circuit configuration of the radar apparatus 1 compact.

In the radar apparatus 1, the receiving antennas and the transmitting antennas are independently provided, but the receiving antennas may also have the function of a transmitting antenna. In this case, the antennas can change into a receiving mode right after transmitting radar waves and receive reflected waves of the radar waves transmitted by themselves.

When power is supplied to the radar apparatus 1 from the vehicle, the processor 9 activates the functioning units, such as a Fourier conversion unit 17, a peak extracting unit 18, an orientation calculating unit 19, and a distance/relative angle calculating unit 20, by executing computer programs. The functioning units are functioning units that are activated by the processor 9 executing computer programs in cooperation with a memory 31, but for the convenience of description, FIG. 3 illustrates the functioning units in the processor 9. The functioning units are not limited to being activated by software, and for example, all or some of the functioning units may be activated by exclusive calculation circuits disposed inside or outside the processor 9.

<Operation>

Figure 4:
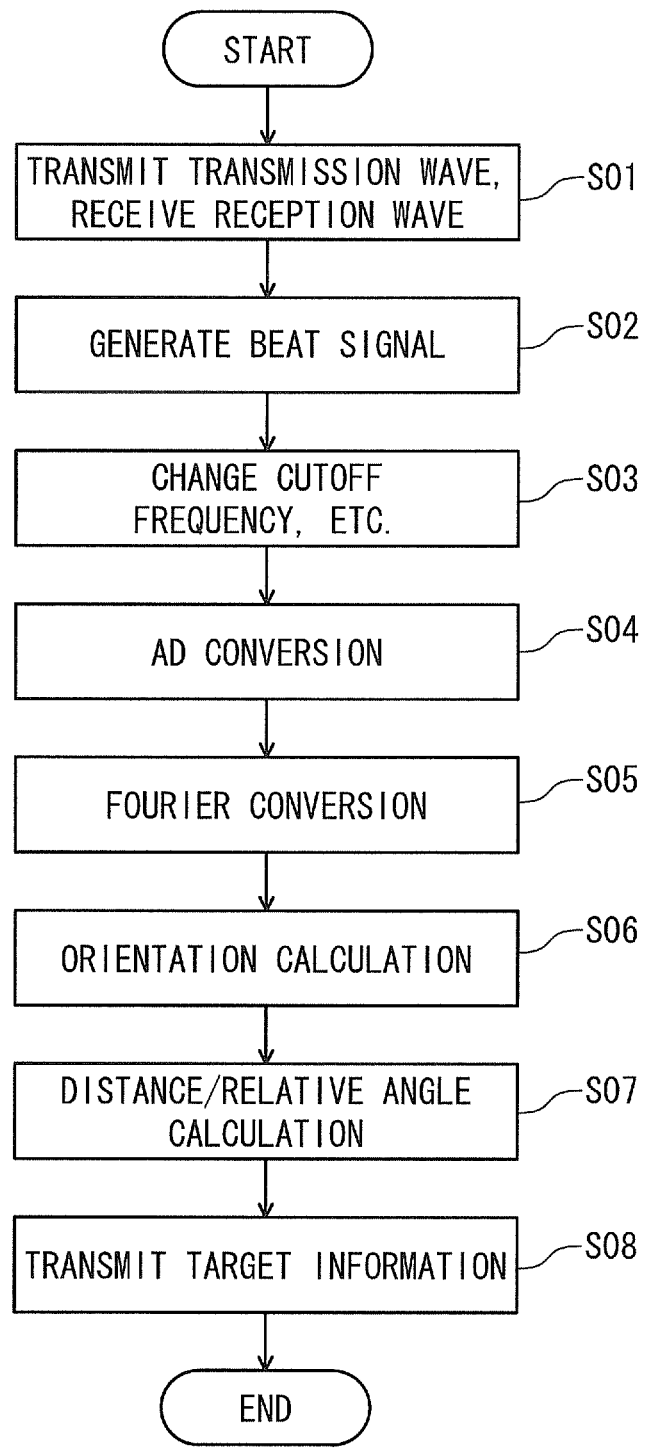
FIG. 4 is a flowchart illustrating a process flow of the radar apparatus according to the embodiment.

The operation of the radar apparatus 1 is described with the processes performed in the radar apparatus 1. FIG. 4 is a diagram illustrating a process flow of the radar apparatus. The process shown in FIG. 4 is started when the driving source of a vehicle is in operation, that is, if the driving source is an internal combustion engine, when the engine is started, and if the driving source is an hybrid system or an EV (Electric Car) system, the process is started and repeated when the system is turned on.

Figure 5A:
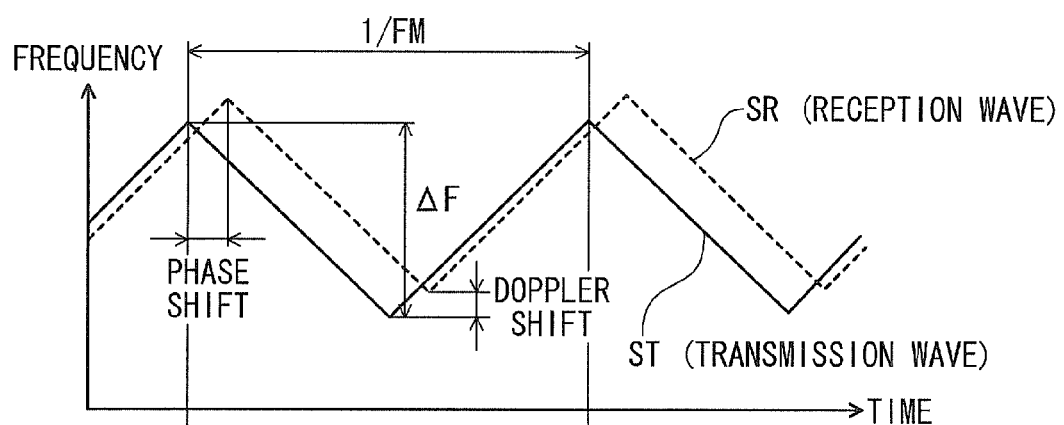
FIGS. 5A and 5B are diagrams illustrating the waveform of a detection signal that is processed in the radar apparatus according to the embodiment.

The radar apparatus 1 of the embodiment uses an FM-CW (Frequency Modulation-Continuous Wave) type, and in step S01, the signal generating unit 14 generates a triangular wave signal and transmits a transmission wave ST of which the frequency is changed into a triangular waveform shown in FIG. 5A by being modulated by the oscillator 13, under the control of the transmission control unit 16. The radar apparatus 1 includes two transmission antennas 10, the transmission control unit 16 controls the transmission conversion switches, such that the modes of the transmission conversion switches are appropriately converted, and transmission waves are transmitted from the transmitting antennas 10 to the target. Reception waves SR reflected from the target is received by the receiving antennas 3.

Figure 5B:
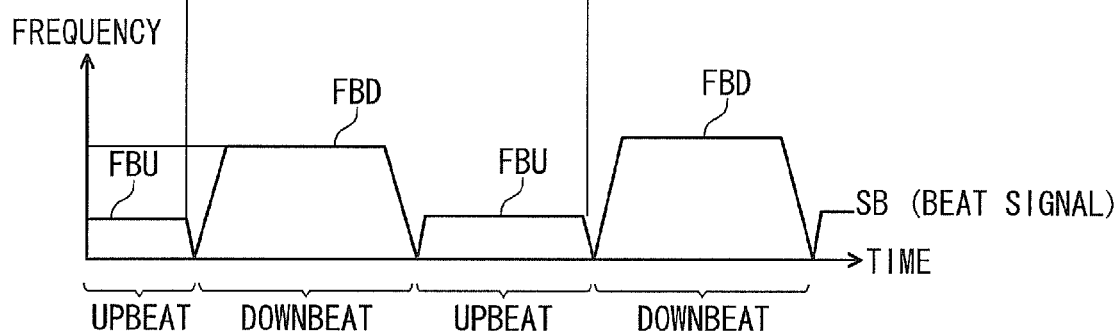

In step S02, the mixers 4 (ch1-4) generate beat signals SB shown in FIG. 5B, that is, detection signals, by mixing the received reception waves SR with the transmission waves ST. In FIGS. 5A and 5B, the phase difference (phase shift) between the transmission signal ST and the reception signal SR increases/decreases in proportion to the distance between the target and the radar apparatus and the frequency difference between the transmission wave ST and the reception wave SR (Doppler shift) increases/decreases in proportion to the relative speed between the target and the radar apparatus. Reference numeral FM in FIGS. 5A and 5B indicates the frequency of a triangular wave generated by the signal generating unit 14. On the other hand, when there is a plurality of targets with different relative speeds or distances, the antennas each receive a plurality of reflective waves with different phase shift amount or Doppler shift amount and various components corresponding to the targets are included in the beat signals SB obtained from the mixers 4 (ch1-4), but FIGS. 5A and 5B illustrate an example of a waveform where there is one target, for ease of understanding. The generated beat signals are amplified by the low-noise amplifiers 5 and outputted to the bandwidth filters 6.

In step S03, the bandwidth filters (band-pass filter) give changes to the beat signals SB, that is, the detection signals corresponding to the receiving antennas 3, respectively, in a frequency bandwidth higher than Nyquist frequency that is a half the sampling frequency, in addition to removing the signals in unnecessary bandwidths. In detail, for example, a cutoff frequency for each channel (ch1-4) is changed as a characteristic for each bandwidth filter 6 (band-pass filter) and the bandwidth filters 6 (ch1-4) output detection signals with different signal strengths in a frequency bandwidth higher than Nyquist frequency. As a result, differences are generated in the levels (amplitude levels) or the phases of the detection signals outputted from the bandwidth filters 6 (ch1-4). The level of a detection signal is the strength levels of a signal.

Figure 6A:
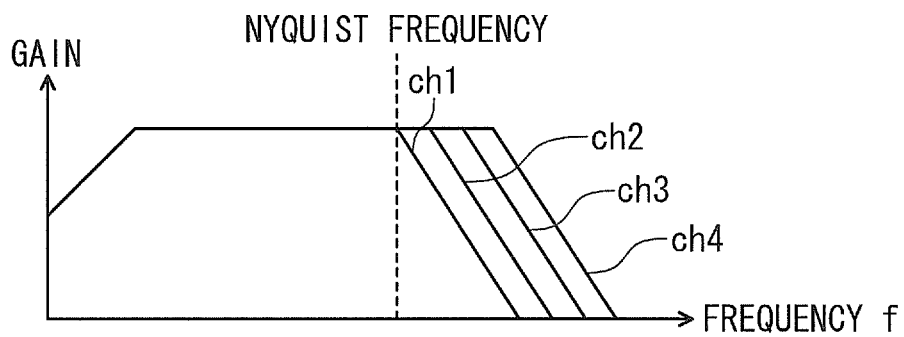
FIG. 6A is a diagram illustrating an example of the characteristics of bandwidth filters that are configured such that differences are generated in the levels or phases of detection signals output from the bandwidth filters (ch1-4), in a frequency bandwidth higher than Nyquist frequency.
Figure 6B:
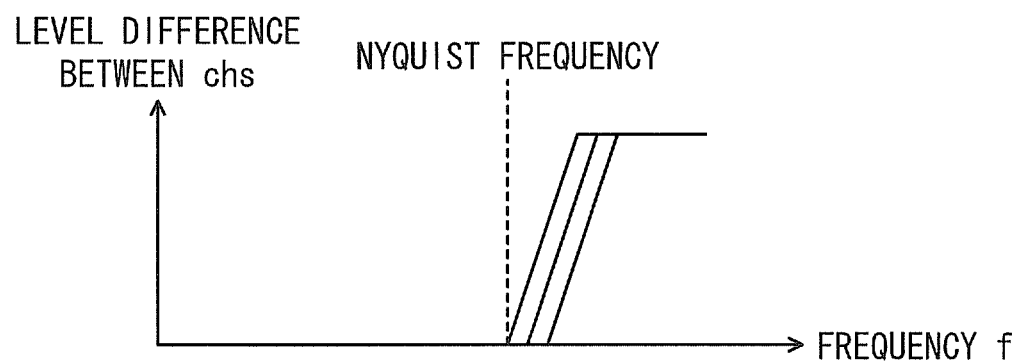
FIG. 6B is a diagram illustrating the relationship between the characteristics of the bandwidth filters and the level differences, corresponding to FIG. 6A.
Figure 6C:
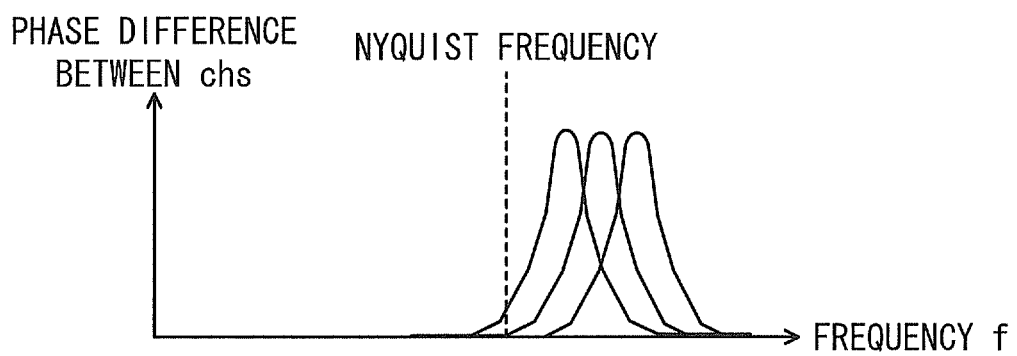
FIG. 6C is a diagram illustrating the relationship between the characteristics of the bandwidth filters and the phase differences, corresponding to FIG. 6A.

FIG. 6A is a diagram illustrating an example of the characteristics of the bandwidth filters that are configured such that differences are generated in the levels or phases of detection signals output from a bandwidth filter 6 (ch1-4), in a frequency bandwidth higher than Nyquist frequency. In FIG. 6A, all the filter characteristics of the bandwidth filters 6 (ch1-4) are set to be different in a frequency bandwidth higher than Nyquist frequency. In detail, the filter characteristics are set to satisfy the relationship, ch1<ch2<ch3<ch4. The filter characteristics can be freely set by independently changing the cutoff frequency, the Q value, and the filter order. FIG. 6B is a diagram illustrating the relationship between the characteristics of the bandwidth filters and the level differences between the channels, corresponding to FIG. 6A. The level differences are the differences in strength levels of detection signals. As shown in FIG. 6B, differences are generated in the levels (ch1-4) of the detection signals in a frequency bandwidth higher than Nyquist frequency by changing the filter characteristics of the bandwidth filters 6 (ch1-4). FIG. 6C is a diagram illustrating the relationship between the characteristics of the bandwidth filters and the phase differences, corresponding to FIG. 6A. As shown in FIG. 6C, differences are generated in the phases of the detection signals (ch1-4) in a frequency bandwidth higher than Nyquist frequency by changing the filter characteristics of the bandwidth filters 6. As described above, differences are generated in the levels or the phases of the detection signals outputted from the bandwidth filters 6 (ch1-4), in a frequency bandwidth higher than Nyquist frequency by changing the filter characteristics of the bandwidth filters 6 (ch1-4). Differences are generated in the levels or the phases between channels even in the signal components of the target in the same frequency of frequency bandwidth higher than Nyquist frequency by frequency analysis performed on the detection signals by the fourier conversion unit 17, which is described below. Therefore, differences are generated in the levels or the phases between channels even in the signal components of the target in the same frequency generated by the replication due to Nyquist frequency. It is possible to determine whether the signal components of the target are generated by the replication due to Nyquist frequency, on the basis of the differences in the levels or the phases between channels of the signal components. The determination is described in detail below. As it is possible to determine whether the signal components are generated by the replication due to Nyquist frequency, it is possible to remove the signal components generated by the replication due to Nyquist frequency and to prevent a detection error of the target which is caused by the replication due to Nyquist frequency. The detection signals given the changes by the bandwidth filters 6 are amplified by the amplifiers 7 and outputted to the AD converters 8.

In step S04, the AD converters 8 perform AD conversion by sampling the detection signals amplified by the amplifiers 7 to the sampling frequency. The AD-converted detection signals are outputted to the signal processing device 15.

In the signal processing device 15, the processes of steps S05 to S08 are performed by the processor 9. The processes of steps S06 to S08 correspond to predetermined processes of the invention.

Figure 7:
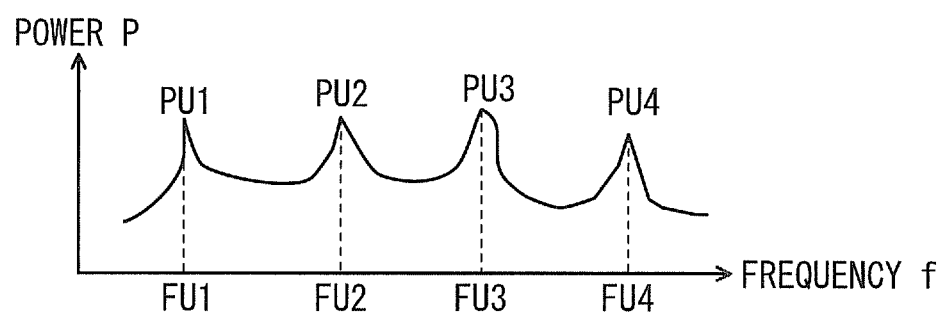
FIG. 7 is a diagram illustrating a frequency spectrum of an upbeat frequency component.
Figure 8:
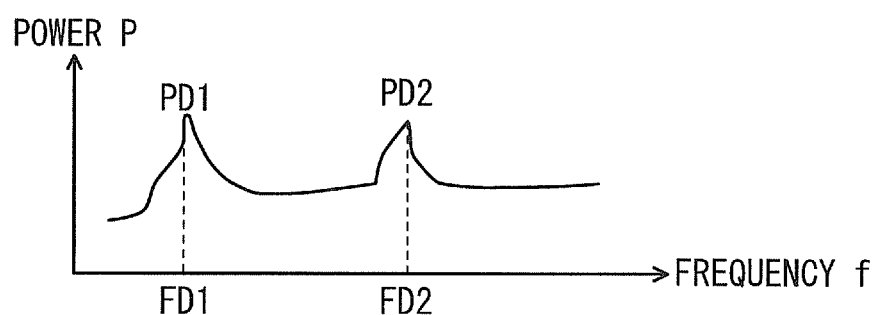
FIG. 8 is a diagram illustrating a frequency spectrum of a downbeat frequency component.

In step S05, the processor 9 performs fourier conversion on each channel for each of the upbeat frequency component FBU and the downbeat frequency component FBD of the detection signals, that is the beat signals SB and achieves the frequency spectrum of the upbeat frequency component FBU shown in FIG. 7 and the frequency spectrum of the downbeat frequency component FBD shown in FIG. 8.

Since the receiving antennas 4 (ch1-4) receive the same reflective wave from the target, frequency spectrums having the same peak frequency and the same shape are obtained from the receiving antennas 3 (ch1-4) in the fourier conversion. However, since the phases of the receiving antennas 3 (ch1-4) are different, the phases are different for the antennas even at the same peak frequency. For example, the peak PU1 (ch1) of the frequency spectrum of the receiving antenna 3 (ch1) and the peak PU1 (ch2) of the frequency spectrum of the receiving antenna 3 (ch2) are the same in frequency but different in phase. The peak of a frequency spectrum shows the signal component of the target. In FIG. 7, when the peaks PU1 to PU3 are the correct signal components of the target having a frequency component lower than the cutoff frequency of the bandwidth filter 6 and the peak PU4 is the signal component of the target which is generated by the replication due to Nyquist frequency, the peaks PU1 to PU3 have no difference in level among ch1 to ch4. However, since the peak PU4 is generated by replication from a frequency bandwidth higher than the cutoff frequency of the bandwidth filter 6, a difference in level is generated among ch1 to ch4. It is determined whether the signal components are wrong signal components generated by the replication due to Nyquist frequency, by calculating the differences in level among channels, for the peaks PU1 to PU4, as described above. In FIG. 7, it is determined that PU4 is a wrong signal component of the target which is generated by the replication due to Nyquist frequency, and PU4 is excepted in the following processes.

The processor 9 extract peaks of a predetermined power or more from the frequency spectrums of the upbeat frequency component FBU and the downbeat frequency component FBD, which are obtained by fourier conversion, and as described above, extracts the frequency, power, and phase of the peaks, except for the peak generated by replication due to Nyquist frequency.

Since the information on a plurality of targets may be included in the peak of a frequency spectrum, it is necessary to separate the target from one peak and estimate the angle of the separated target. Therefore, in step S06, the processor 9 obtains the angle spectrum shown in FIG. 9 by calculation, on the basis of the fact that all the receiving antennas 3 (ch1-4) has peaks having the same frequency (for example, the peak PU1 (ch1), peak PU1 (ch2), PU1 (ch3), and PU1 (ch4) are the peaks of the same frequency FU1, for the upbeat frequency component FBU, and the peak PD1 (ch1), peak PD1 (ch2), PD1 (ch3), and PD1 (ch4) are the peaks of the same frequency FD, for the downbeat frequency component FBD), for the upbeat frequency component FBU and the downbeat frequency component FBD.

Various methods, such as a CAPON method or a DBF method, have been proposed as a method of obtaining an angle spectrum, the processor 9 of the radar apparatus 1 according to the embodiment obtains an angle spectrum on the basis of a predetermined angle estimation method (for example, MUSIC or ESPRIT, or maximum likelihood estimation) which needs to set in advance the number of incoming waves as the number of separable angles, by using the characteristic value or the characteristic vector of a correlation matrix formed on the basis of the signal components, that is the frequency peak information of the target extracted from the detection signal. For example, ESPRIT forms a correlation matrix from the frequency peak information and estimates the incoming direction of incoming waves on the basis of the property of the characteristic value or the characteristic vector, under the assumption that the wave source of reflective waves are spot wave sources without diffusion and the reflective waves are planar waves traveling in parallel into all the receiving antennas. Therefore, the information on the number of incoming waves is needed in advance when a correlation matrix or a characteristic value is handled.

Figure 9:
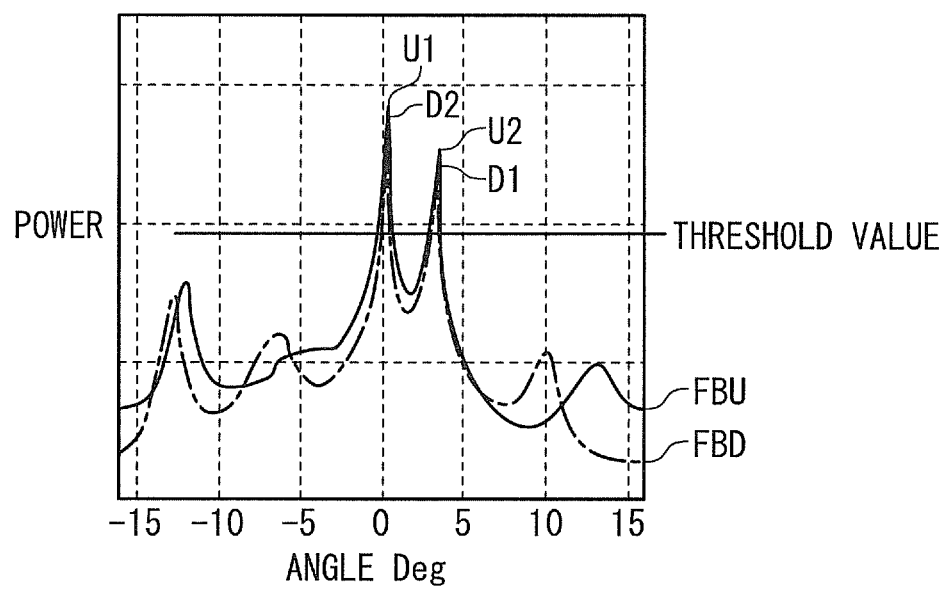
FIG. 9 is a diagram illustrating an angle spectrum.

The processor 9 calculates the angle spectrum for each peak frequency of a frequency spectrum by using a predetermined angle estimation method. For example, for the frequency spectrum shown in FIGS. 7 and 8, the processor 9, for example, extracts angle spectrums for five peak frequencies Fu1-3, FD1-2. FIG. 9 illustrates an example of the angle spectrum of a peak frequency Fill, in which the upbeat frequency component FBU and the downbeat frequency component FBD are shown. The angle and power of the peak of an angle spectrum is extracted for the angle spectrums of the five peak frequencies FU1-3 and FD1-2. FIG. 12 illustrates an example of the angle and the power of each peak of angle spectrums of five peak frequency FU1-3, FD1-2.

In the embodiment, the processor 9, as described above, determines whether the signal components generated by the filter characteristics of the bandwidth filters 6 (ch1-4) are components generated by the replication due to Nyquist frequency, on the basis of the differences in levels or phases of the signal components, and removes the signal components generated by the replication due to Nyquist frequency. As differences are given to the levels or phases of the signal components, a plurality of examples is generated in determining of whether the signal components are components generated by the replication due to Nyquist frequency.

Figure 10:
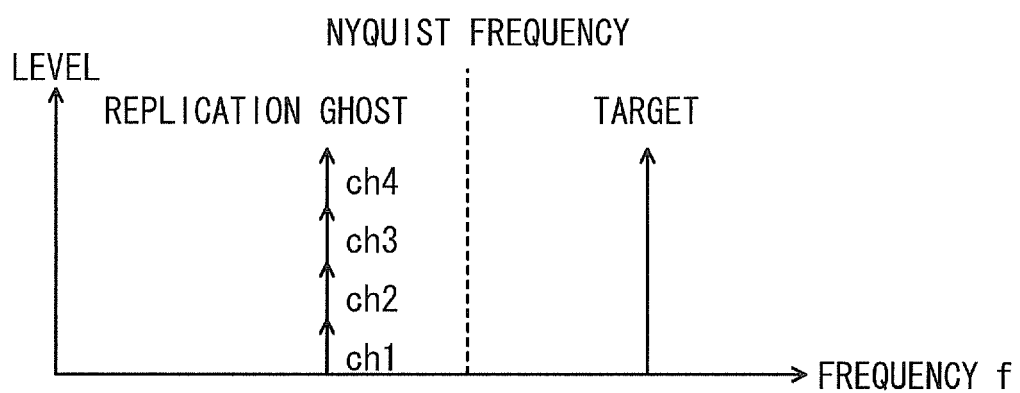
FIG. 10 is a diagram illustrating a frequency spectrum in a first aspect where the signal components of the target are determined as the signal components generated due to the replication by Nyquist frequency.

As a first aspect, the processor 9 acquires the signal components obtained by frequency analysis from the detection signals corresponding to the receiving antennas 3 (ch1-4), and when signal components having different levels are detected at one frequency value, the processor 9 determines that the signal components corresponding to the frequency are generated by the replication due to Nyquist frequency. FIG. 10 is a frequency spectrum illustrating the first aspect where the signal components are determined as the signal components generated due to the replication by Nyquist frequency. As shown in FIG. 10, when the characteristics of the bandwidth filters 6 (ch1-4) are different, the detected target is a ghost, signals at several levels are detected at one frequency value. As a result, the processor 9 can determines whether the signal components of the target are generated by the replication due to Nyquist frequency. The processor 9 excepts the signal components from the detection target as the target, when the signal components are generated by the replication due to Nyquist frequency.

Figure 11:
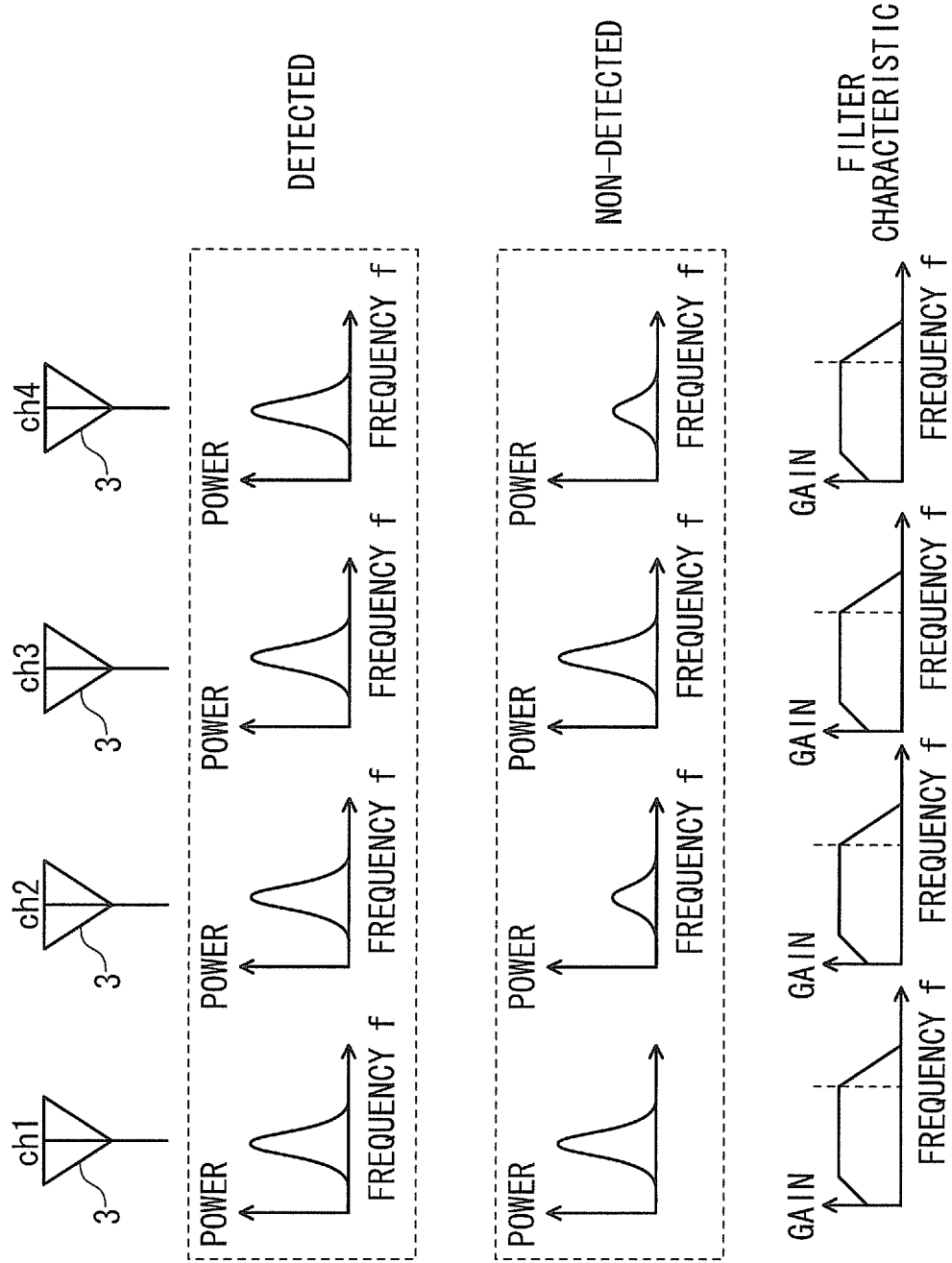
FIG. 11 is a diagram illustrating a second aspect where the signal components of the target are determined as the signal components generated due to the replication by Nyquist frequency.

As a second aspect, the processor 9 acquires signal components obtained by the frequency analysis from the detection signals corresponding to the receiving antennas 3 (ch1-4), and when the level difference between the signal components at the same frequency is a predetermined value or more, the processor 9 determines that the signal components are generated by the replication due to Nyquist frequency. FIG. 11 illustrates a second aspect when the signal components of the target are determined as the signal components generated due to the replication by Nyquist frequency. In FIG. 11, the bandwidth filter 6 (ch1) and the bandwidth filter 6 (ch3) have the same characteristic, the bandwidth filter 6 (ch2) and the bandwidth filter 6 (ch4) have the same characteristic, and for example, a difference of 10 dB is provided in advance between the bandwidth filter 6 (ch1) and the bandwidth filter 6 (ch2). Therefore, when the level difference between the signal component ch1 and the signal component ch2 is 10 dB or more, the processor 9 determines that the signal components are generated by the replication due to Nyquist frequency, and excepts the signal components from the detection target as the target. When the level difference between the signal component ch1 and the signal component ch2 is not 10 dB or more, the processor 9 determines that the signal components are not generated by the replication due to Nyquist frequency, and detects the signal components as the target. On the other hand, when the target located in front of the vehicle, there is no difference generated in level of the signal components of the channels. When the target is located at an angle from the vehicle, a difference is generated in level of the signal components of the channels, but the vehicle can be specified by the antenna characteristics. Therefore, it is possible to set the predetermined value as a reference value for determining that the signal components are generated by the replication due to Nyquist frequency, by considering the antenna characteristics.

As a third aspect, the processor 9 acquires the signal components obtained by the frequency analysis corresponding to the receiving antennas 3 (ch1-4), and when the phase difference between the signal components at one frequency is a predetermined value or more, the processor 9 can determine that the signal components are generated by the replication due to Nyquist frequency. The phase difference can be obtained from the angle spectrum. For example, the bandwidth filter 6 (ch1) and the bandwidth filter 6 (ch3) have the same characteristic, the bandwidth filter 6 (ch2) and the bandwidth filter 6 (ch4) have the same characteristic, and a phase difference is set in advance between the bandwidth filter 6 (ch1) and the bandwidth filter 6 (ch2). Therefore, when the phase difference between the bandwidth filter 6 (ch1) and the bandwidth filter 6 (ch2) is a predetermined value or more, the processor 9 determines that the signal components are generated by the replication due to Nyquist frequency, and excepts the signal components from the detection target, as the target. When the phase difference between the bandwidth filter 6 (ch1) and the bandwidth filter 6 (ch2) is not a predetermined value or more, the processor 9 determines that the signal components are not generated by the replication due to Nyquist frequency, and detects the signal components as the target. The predetermined value of the phase difference can also be set arbitrarily in consideration of antenna characteristics.

By this configuration described above, it is possible to determine whether the signal components of the target are generated by the replication due to Nyquist frequency, and as a result, when the signal components are generated by the replication due to Nyquist frequency, the signal components can be excepted from the target. As a method of except the signal components from the target, as described above, it is preferable not to perform the orientation calculation in step S06 on the peak that is determined as a replication ghost, for the frequency peaks of the ch1 to ch4 obtained by fourier conversion in step S05. Therefore, it is possible to omit unnecessary calculations. The process after determining whether the signal components of the target are generated by the replication due to Nyquist frequency is described hereafter.

In step S07, when extracting the angles and powers of the angle spectrums, the processor 9 specifies the practically existing target by pairing the peaks. That is, the processor 9 pairs peaks with close angle or power in the peaks of the angle spectrum of the upbeat frequency component FBU and the angle spectrum of the downbeat frequency component FBD. For example, in the angle spectrum shown in FIG. 9, the angles and powers of the peak U1 and peak U2 of the upbeat frequency component FBU of the peak frequency FU1 are close to the angles and powers of the peak D1 and peak D2 of the downbeat frequency component FBD. For example, the angles of the peak U1 and peak D2 are close to about 0 degree and the angles of the peak U2 and peak D1 are close to about 3 degrees. Therefore, the angle θU1 and the power PWU1 of the peak U1 shown in FIG. 12 are close to the angel θU2 and the power PWD2 of the peak D2 while the peak U1 and the peak D2 are paired, such that it is specified that the peak U1 and the peak D2 indicate a target TG1.

The processor 9 specifies five targets of targets TG1-5, as shown in FIG. 12, by paring the peaks (peaks U1-6) of the angle spectrum of the upbeat frequency component FBU with the peaks (peaks D1-5) of the angle spectrum of the downbeat frequency component FBD. The peak U6 of the angle spectrum of the upbeat frequency component FBU is not paired with any peak of the angle spectrum of the downbeat frequency component FBD. Therefore, it can be seen that the peak U6 is a peak generated by internal noise, not by the practically existing target.

The processor 9 calculates the angle or distance, and the relative speed on the basis of the paired peak frequency. When the transmission speed of a radar wave is C, the modulation frequency of the triangular wave generated by the signal generating unit 14 is FM, the center frequency of the triangular wave is F0, and the modulated width is ΔF, the distances R (R1 to R5) and the relative speeds (V1 to V5) of the targets are induced from the following equations.

$$R=((FU+FD)\cdot C/(8\cdot \Delta F\cdot FM)$$

$$V=((FD+FD)\cdot C)/(4\cdot F0)$$

For the angles of the target, the peak of the paired upbeat frequency component FBU and the peak of the downbeat frequency component FBD are the same in angle, but the angle D (D1 to D5) of the angles are induced from the following equation in order to increase the accuracy.

$$D=(\theta U+\theta D)/2$$

In step S08, the processor outputs the data of the angles, distances, and relative speeds of the targets to the communication circuit 21 and the alarm control circuit 29, as target information. The alarm control circuit 29 is connected to the buzzer lamp 30 and controls the buzzer lamp 30 in accordance with the target information. For example, when the five targets shown in FIG. 12 are specified by the peaks of the angle spectrum, data shown in FIG. 13 is transmitted to the communication circuit 21 from the processor 9. The data of the angles, distances, and relative speeds of the targets is used for control of the vehicle. That is, the drive-assist device 22 is connected to an engine control ECU 23, a brake control ECU 24, a group of a vehicle speed meter, an rpm meter, a temperature meter, and an alarm 25, a seatbelt pretensioner 26, a vehicle speed sensor 27, and a yaw rate sensor 28, through a CAN bus. The information on ON/OFF of an ACC system, the information on ON/OFF of wipers, and the information on the inter-vehicle distance are inputted to the drive-assist device 22. The drive-assist device 22 performs safe drive-assist control by controlling the engine control ECU 23, the brake control ECU 24, the group of a vehicle speed meter, an rpm meter, a temperature meter, and an alarm 25, and the seatbelt pretensioner 26, on the basis of the target information, the vehicle speed information from the vehicle speed sensor 27, and the information on the turning direction from the yaw rate sensor 28.

<Effect>

In the radar device 1 of the embodiment described above, since the bandwidth filters 6 have different characteristics for each channel, changes are given to the detection signals of respective channels in a frequency bandwidth higher than Nyquist frequency. As a result, when the signal components obtained by performing frequency analysis on the detection signals are generated by the replication due to Nyquist frequency, the signal frequency including the changes is acquired. Therefore, it is possible to determine whether the signal components of the target are generated by the replication due to Nyquist frequency. It is possible to prevent a detection error of the target due to acquiring of signal components generated by the replication, by determining whether the signal components of the target are generated by the replication due to Nyquist frequency. In the radar apparatus 1, since it is not necessary to make the cutoff characteristic of the band-pass filter precipitous, contrary to the related art, the number of parts can be suppressed and thus the cost can be suppressed. The radar apparatus 1, for example, does not need oversampling of a superspeed AD converter, such that the cost of the radar apparatus does not largely increase.

Although preferred embodiments of the invention are described above, a radar apparatus of the invention is not limited thereto and may be implemented by combinations of them.

What is claimed is:

1. A radar apparatus configured to detect a target, the radar apparatus comprising:
a plurality of antennas;
a detection signal generating unit configured to generate detection signals of the target on the basis of transmission and reception waves of the antennas; and
a detection signal processing unit configured to perform frequency analysis on the detection signals of the target, which are generated by the detection signal generating unit to extract signal components of the target, and to perform a predetermined process on the signal components to calculate at least one of a distance to the target, a relative speed to the target, and an orientation of the target,
wherein the detection signal generating unit includes a filter unit configured to give changes to the detection signals corresponding to the antennas, respectively, in a frequency bandwidth higher than Nyquist frequency which is a half a sampling frequency, and
wherein the detection signal processing unit is configured to acquire the signal components from the detection signals corresponding to the antennas, respectively, to which the filter unit gives the changes to determine whether the signal components are generated by replication due to the Nyquist frequency.

2. The radar apparatus according to claim 1, wherein the filter unit gives changes to at least one of a strength of each of the detection signals and a phase of each of the detection signals.

3. The radar apparatus according to claim 1, wherein the filter unit includes a plurality of filters corresponding to the antennas, respectively, and one of the filters has a different characteristic from another of the filters.

4. The radar apparatus according to claim 1, wherein the detection signal processing unit determines that the signal components are generated by the replication due to the Nyquist frequency when the signal components having different levels are detected at one frequency value.

5. The radar apparatus according to claim 1, wherein the detection signal processing unit determines that the signal components are generated by the replication due to the Nyquist frequency when a level difference between the signal components at the same frequency is a predetermined value or more.

6. The radar apparatus according to claim 1, wherein the detection signal processing unit determines that the signal components are generated by the replication due to the Nyquist frequency when a phase difference between the signal components at one frequency is a predetermined value or more.

7. A method of detecting a target with a radar apparatus equipped with a plurality of antennas, the method comprising:
a detection signal generating step of generating detection signals of the target on the basis of transmission and reception waves of the antennas; and
a detection signal processing step of performing frequency analysis on the detection signals of the target, which are generated in the detection signal generating step to extract signal components of the target, and performing a predetermined process on the signal components to calculate at least one of a distance to the target, a relative speed to the target, and an orientation of the target,
wherein the detection signal generating step includes a filtering step of giving changes to the detection signals corresponding to the antennas, respectively, in a frequency bandwidth higher than Nyquist frequency which is a half a sampling frequency, and wherein the detection signal processing step acquires the signal components from the detection signals corresponding to the antennas, respectively, to which the filtering step gives the changes to determine whether the signal components are generated by replication due to the Nyquist frequency.

\* \* \* \* \*